3,119,847
SULPHONAMIDES
Ernst Jucker, Binningen, Basel-Land, and Adolf J. Lindenmann, Basel, Switzerland, assignors to Sandoz Ltd. (also known as Sandoz A.G.), Basel, Switzerland, a Swiss firm
No Drawing. Filed June 12, 1961, Ser. No. 116,305
Claims priority, application Switzerland June 15, 1960
10 Claims. (Cl. 260—397.7)

The present invention relates to new sulphonamides having the structural Formula I

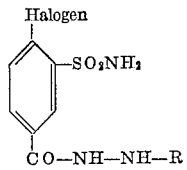

wherein R is selected from the group consisting of alkyl containing 1 to 4 carbon atoms, phenyl, chloro-phenyl, nitrophenyl, sulphamylphenyl, chlorosulphamylphenyl and tolyl, and pharmaceutical compositions containing, in addition to an inert carrier, a compound I.

In Formula I, Halogen is preferably a chlorine or fluorine atom.

The sulphonamides of this invention can be prepared by reacting a 3-sulphamyl-4-halogeno-benzoyl chloride with a compound of the general Formula II

wherein R has the above significance.

The preparation of the new sulphonamides can be carried out as follows: A suspension in an inert solvent, for example chloroform, of 3-sulphamyl-4-chlorobenzoyl chloride is mixed with a solution of a hydrazine of the general Formula II in a solvent therefor, for example triethylamine and chloroform, and stirred at room temperature until the reaction has gone to completion, for example for 1 to 3 days. Isolation and purification of the required product I is then effected by methods known per se.

The compounds of the invention, which are at room temperature solid crystalline compounds, have interesting pharmacodynamic properties and/or may be used as intermediate compounds for the production of pharmaceuticals. The exemplified compounds show, depending upon the nature of the radical R in Formula I, diuretic, sodium uretic and chloride uretic properties.

The compounds can be administered in therapeutic dosages in conventional vehicles as in the form of a tablet as these compounds are effective upon oral administration as well as upon injection.

The preparation of these compounds is more fully described in the following examples. It is to be understood, however, that the examples are illustrative of the compounds embraced by this invention and are not to be construed as limiting the invention to the particular compounds specifically described. All temperatures are stated in degrees centigrade.

*Example 1.—1-Phenyl-2-(3'-Sulphamyl-4'-Chlorobenzoyl)-Hydrazine*

In the course of one hour a suspension of 15.0 g. of 3-sulphamyl-4-chlorobenzoic acid chloride in 120 cc. of abs. chloroform is added at 20–25° to a stirred solution of 6.5 g. of phenyl hydrazine and 6.1 g. of triethylamine in 180 cc. of abs. chloroform, stirring of the reaction mixture being continued at room temperature for 48 hours. The mixture is then boiled down until dry, the residue taken up in about 300 cc. of ethyl acetate and thoroughly washed with water. After the solution has been dried on magnesium sulphate, the ethyl acetate is distilled off in a vacuum and the residue, representing the 1-phenyl-2-(3'-sulphamyl-4'-chlorobenzoyl)-hydrazine is crystallised from a mixture of ethyl acetate/petroleum ether. After having been recrystallised from methanol/petroleum ether the hydrazine derivative melts at 185–187°.

*Example 2.—1-(4''-Chlorophenyl)-2-(3'-Sulphamyl-4'-Chlorobenzoyl)-Hydrazine*

In the course of one hour a suspension of 15.0 g. of 3-sulphamyl-4-chlorobenzoyl chloride in 180 cc. of chloroform is added at 20–25° to a stirred solution of 8.5 g. of 4-chlorophenyl hydrazine and 6.1 g. of triethylamine in 200 cc. of chloroform, stirring of the reaction mixture being continued at room temperature for 50 hours. The mixture is then boiled down until dry, the residue taken up in 300 cc. of ethyl acetate and washed with a total of 200 cc. of water. The solution having been dried on magnesium sulphate, the ethyl acetate is distilled off in a vacuum and the residue, representing the 1-(4''-chlorophenyl) - 2-(3'-sulphamyl-4'-chlorobenzoyl)-hydrazine, is crystallised from methanol and recrystallised from a methanol/petroleum ether mixture. M.P., 224–225°.

*Example 3.—1-(4''-Nitrophenyl)-2-(3'-Sulphamyl-4'-Chlorobenzoyl)-Hydrazine*

In the course of one hour a suspension of 15.0 g. of 3-sulphamyl-4-chlorobenzoyl chloride in 20 cc. of chloroform is added at 20–25° to a stirred solution of 9.1 g. of 4-nitrophenyl hydrazine and 6.1 g. of triethylamine in 280 cc. of chloroform, stirring of the reaction mixture being continued at room temperature for 48 hours. The mixture is then boiled down until dry, the residue is taken up in 300 cc. of ethyl acetate and 200 cc. of water are added. The solution is filtered, the aqueous phase in the filtrate being separated and the filtration residue recombined with the ethyl acetate phase. This is then boiled down until dry and the residue, representing the 1-(4''-nitrophenyl)-2-(3'-sulphamyl-4'-chlorobenzoyl)-hydrazine, is recrystallised from acetone. H.P., 283–284°.

*Example 4.—1-(4''-Sulphamyl-Phenyl)-2-(3'-Sulphamyl-4'-Chlorobenzoyl)-Hydrazine*

In the course of one hour a suspension of 15.0 g. of 3-sulphamyl-4-chlorobenzoyl chloride in 180 cc. of chloroform is added at 20–25° to a stirred suspension of 11.0 g. of 4-sulphamyl-phenyl hydrazine and 6.1 g. of triethylamine in 200 cc. of chloroform, stirring of the reaction mixture being continued at room temperature for 48 hours. The mixture is then boiled down until dry, the residue being taken up in 300 cc. of ethyl acetate and washed with a total of 200 cc. of water. After the solution has been dried on magnesium sulphate the ethyl acetate is distilled off in a vacuum and the residue, representing the 1-(4''-sulphamyl-phenyl)-2-(3'-sulphamyl-4'-chlorobenzoyl)-hydrazine, is crystallised and re-crystallised from a methanol-ether mixture. M.P. at 176° (whilst beginning to decompose).

*Example 5.—1-Phenyl-2-(3'-Sulphamyl-4'-Fluorobenzoyl)-Hydrazine*

In the course of 30 minutes 4.2 g. of phenyl hydrazine are added to a suspension, whilst this is being stirred, of 4.6 g. of 3-sulphamyl-4-fluorobenzoyl chloride in 50 cc. of chloroform, the temperature rising to 35°. Stirring of the reaction mixture is continued at 20–25° for 20 hours. The mixture is filtered, the residue dispersed in 50 cc. of warm water (about 30–32°), the suspension is stirred for a while and then filtered. The filtration residue is dried in a vacuum between 20 and 25° and the 1-phenyl-2-(3′-sulphamyl-4′-fluorobenzoyl)-hydrazine is recrystallised from methanol. M.P., 179–180°.

The 3-sulphamyl-4-fluorobenzoyl chloride used as a starting material is prepared as follows:

(a) *3-chlorosulphonyl-4-fluorobenzoic acid*.—A solution of 14.0 g. of fluorobenzoic acid in 52.0 g. of chlorosulphonic acid is kept at 130° for 10 hours. The solution is then cooled to room temperature and poured on ice, causing the 3-chlorosulphonyl-4-fluorobenzoic acid to precipitate. This is filtered off, the filtration residue being taken up in ether, a little water being separated, and the ethereal solution dried on magnesium sulphate. The ethereal solution is then concentrated and petroleum ether is added, causing the 3-chloro-sulphonyl-4-fluorobenzoic acid to precipitate in crystalline form. After having been recrystallised from a benzene/petroleum ether mixture the acid melts at 138–139°.

(b) *3-sulphamyl-4-fluorobenzoic acid*.—150 cc. of an absolute saturated ethanolic solution of ammonia are slowly added to 14.1 g. of 3-chlorosulphonyl-4-fluorobenzoic acid whilst the reaction mixture is being stirred and strongly cooled. Complete dissolution takes place. Stirring is then continued for another 2 hours at room temperature. The solution is concentrated and about 150 cc. of ether are added to the resultant paste which is then filtered off. The filtration residue, representing the 3-sulphamyl-4-fluorobenzoic acid, is dried in a vacuum and used immediately.

(c) *3-sulphamyl-4-fluorobenzoyl chloride*.—A mixture of 15.5 g. of 3-sulphamyl-4-fluorobenzoic acid (raw product) and 31.0 g. of thionyl chloride are heated and kept at 100° for one hour. The reaction mixture is then boiled down in a vacuum until dry, the residue being twice boiled out, each time with 150 cc. of benzene, and the undissolved portion filtered off. The benzene is then driven off in a vacuum and the residue, representing the 3-sulphamyl-4-fluorobenzoyl chloride, is recrystallised from benzene. M.P., 115–116°.

*Example 6.—1-(3″-Sulphamyl-Phenyl)-2-(3′-Sulphamyl-4′-Chlorobenzoyl)-Hydrazine*

In the course of one hour 7.5 g. of 3-sulphamyl-4-chlorobenzoyl chloride are added at 20–25° to a stirred suspension of 5.5 g. of 3-sulphamyl-phenyl hydrazine and 3.0 g. of triethylamine in 300 cc. of chloroform, stirring of the reaction mixture being continued at room temperature for another 48 hours. The mixture is then boiled down until dry, 300 cc. of ethyl acetate and 200 cc. of water are added, and the mixture is thoroughly shaken until everything has completely dissolved. The layers are separated, the ethyl acetate phase being dried on magnesium sulphate and the solvent driven off in a vacuum. The residue, a red oil, is then triturated in acetone, the 1-(3″-sulphamyl-phenyl)-2-(3′-sulphamyl-4′-chlorobenzoyl)-hydrazine separating in crystalline form. This is filtered off, and the hydrazine derivative is recrystallised from a methanol/ether mixture. M.P., 230–233° (whilst beginning to decompose).

*Example 7.—1-(3″-Sulphamyl-4″-Chlorophenyl)-2-(3′-Sulphamyl-4′-Chlorobenzoyl)-Hydrazine*

3.0 g. of triethylamine are added to a suspension of 3.8 g. of 3-sulphamyl-4-chlorophenyl-hydrazine hydrochloride in 75 cc. of chloroform. While stirring 3.7 g. of 3-sulphamyl-4-chlorobenzoyl chloride are added at 20–25° in the course of 30 minutes, and stirring of the reaction mixture is continued at room temperature for 72 hours. The mixture is then boiled down in a vacuum until dry, 600 cc. of ethyl acetate and 200 cc. of water are added, and the whole is well shaken whilst at the same time being heated, until nearly everything has dissolved. The layers are separated, the ethyl acetate phase is dried on magnesium sulphate and the solvent is then driven off in a vacuum. The residue is taken up in a little methanol. After having been kept at room temperature for some time, the 1-(3″-sulphamyl-4″-chlorophenyl)-2-(3′-sulphamyl-4′-chlorobenzoyl)-hydrazine separates in crystalline form.

When the ethyl acetate has been distilled off, the residue may alternatively be chromatographed on alumina, in which case the 1-(3″-sulphamyl-4″-chlorophenyl)-2-(3′-sulphamyl-4′-chlorobenozyl)hydrazine is eluted with a solvent mixture of chloroform and methanol in the proportions of 1:1. After having been recrystallised from methanol the hydrazine derivative melts at 267–269° under decomposition.

The 3-sulphamyl-4-chlorophenyl hydrazine hydrochloride used as a starting material is prepared as follows:

(a) 225 g. of aqueous 30% hydrochloric acid are added to 207 g. of 3-amino-6-chlorobenzenesulphonic acid amide in 500 cc. of water whilst being vigorously stirred and cooled with ice. This is followed by diazotising between 0 and 5° with 250 cc. of a 4 N-solution of sodium nitrite. After having added 110 g. of solid common salt, stirring at this temperature is continued for 30 more minutes and the diazonium salt which has been separated by filtration is then quickly introduced between 2 and 5° into a bisulphite solution having a weak alkaline reaction to phenolphthalein and prepared from 750 cc. of a 40% sodium bisulphite solution and an aqueous solution of sodium hydroxide (approximately 30% strength). After having been stirred for one hour in an ice bath the temperature of the reaction mixture is slowly raised to room temperature and then heated to a temperature of 80° for one hour. At this temperature as much of an aqueous 30% hydrochloric acid is then carefully allowed to run in as will produce an acid Congo reaction. The temperature is then raised to 95° and kept at this level until no more $SO_2$ is evolved. Animal charcoal is added, the hot solution is filtered and the filtrate evaporated at the water pump. The dried residue is exhaustively extracted with hot methanol. By concentrating the methanolic solution the 3-sulphamyl-4-chlorophenyl-hydrazine hydrochloride is obtained which can be recrystallised from water or a water/ethanol mixture. M.P. 217–219° (decomp.).

(b) 10.3 g. of 3-amino-6-chlorobenzenesulphonic acid amide, suspended in a mixture of 34 cc. of water and 11.3 cc. of conc. hydrochloric acid, are diazotised at 0° in the course of 20 minutes whilst being stirred, with a solution of 3.8 g. of sodium nitrite in 10.0 cc. of water, the substance dissolving completely. Stirring being continued, a solution of 30.5 g. of stannic chloride in 51 cc. of conc. hydrochloric acid is added dropwise at 0°. Stirring of the reaction mixture is continued for a further 30 minutes at 0° and for another 60 minutes at room temperature. After removal by filtration of a yellow precipitate the filtrate is evaporated in a vacuum until dry and the residue boiled down three times with 150 to 200 cc. of ethanol in order to remove all residual water. The residue is then boiled up with 80 cc. of ethanol and filtered, 700–800 cc. of ether being added to the filtrate. Precipitated inorganic salts are again filtered off, and the filtrate is boiled down until dry. From an ethanol/ether mixture the 3-sulphamyl-4-chlorophenyl hydrazine hydrochloride can now be crystallised from the residue and, after recrystallisation, the product melts at 217–219° under decomposition.

3-amino-6-chlorobenzenesulphonic acid amide is prepared as follows:

400 g. of iron are mixed with 40 cc. of a conc. hydrochloric acid and heated to 80° after 700 cc. of water have been added. The mixture is well stirred and 237 g. of 3-nitro-6-chlorobenzenesulphonic acid amide are added in small portions to maintain the reaction temperature at about 80°. After having kept the reaction mixture at 80° for an hour and then at 90° for another hour, it is cooled, and the insoluble black precipitate is filtered off, washed with water and twice extracted, each time with one litre of boiling ethanol. The 3-amino-6-chlorobenzenesulphonic acid amide of M.P. 167–169° is obtained in the form of a crystalline residue when the ethanol is evaporated at the water pump.

*Example 8.—1-(4''-Tolyl)-2-(3'-Sulphamyl-4'-Chlorobenzoyl)-Hydrazine*

In the course of 30 minutes 7.6 g. of 3-sulphamyl-4-chlorobenzoyl chloride are added at 20–25° to a stirred solution of 4.7 g. of 4-tolyl-hydrazine hydrochloride and 6.0 g. of triethylamine in 150 cc. of chloroform, stirring of the reaction mixture being continued at room temperature for another 48 hours. The mixture is then boiled down in a vacuum until dry, the residue is taken up in 100 cc. of ethyl acetate and washed with a total of 100 cc. of water.

The solution is dried on magnesium sulphate and the ethyl acetate driven off in a vacuum. The residue is then chromatographed on alumina, the 1-(4''-tolyl)-2-(3'-sulphamyl-4'-chlorobenzoyl)-hydrazine being eluted with a solvent mixture consisting of chloroform and methanol in the proportions of 9:1. After having been recrystallised from methanol the hydrazine derivative melts at 205–207°.

What is claimed is:
1. Sulphonamides of the formula

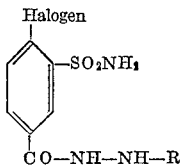

wherein R is phenyl.

2. 1 - phenyl - 2 - (3' - sulphamyl - 4' - chlorobenzoyl) - hydrazine.
3. 1 - (4'' - chlorophenyl) - 2 - (3' - sulphamyl - 4' - chlorobenzoyl)-hydrazine.
4. 1 - (4'' - nitrophenyl) - 2 - (3' - sulphamyl - 4' - chlorobenzoyl)-hydrazine.
5. 1 - (4'' - sulphamylphenyl) - 2 - (3' - sulphamyl - 4'-chlorobenzoyl)-hydrazine.
6. 1 - phenyl - 2 - (3' - sulphamyl - 4' - fluorobenzoyl) - hydrazine.
7. 1 - (3'' - sulphamylphenyl) - 2 - (3' - sulphamyl - 4'-chlorobenzoyl)-hydrazine.
8. 1 - (3'' - sulphamyl - 4'' - chlorophenyl) - 2 - (3' - sulphamyl-4'-chlorobenzoyl)-hydrazine.
9. 1 - (3'' - sulphamyl - 4'' - chlorophenyl) - 2 - (3' - sulphamyl-4'-chlorobenzoyl)-hydrazine.
10. 1 - (4'' - tolyl) - 2 - (3' - sulphamyl - 4' - chlorobenzoyl)-hydrazine.

References Cited in the file of this patent
UNITED STATES PATENTS

| | | |
|---|---|---|
| 2,349,912 | Orthner et al. | May 30, 1944 |
| 3,043,874 | De Wald et al. | July 10, 1962 |

OTHER REFERENCES

Ullman: American Chemical Journal, volume 16, pages 535–543 (1894).